Figure 1:
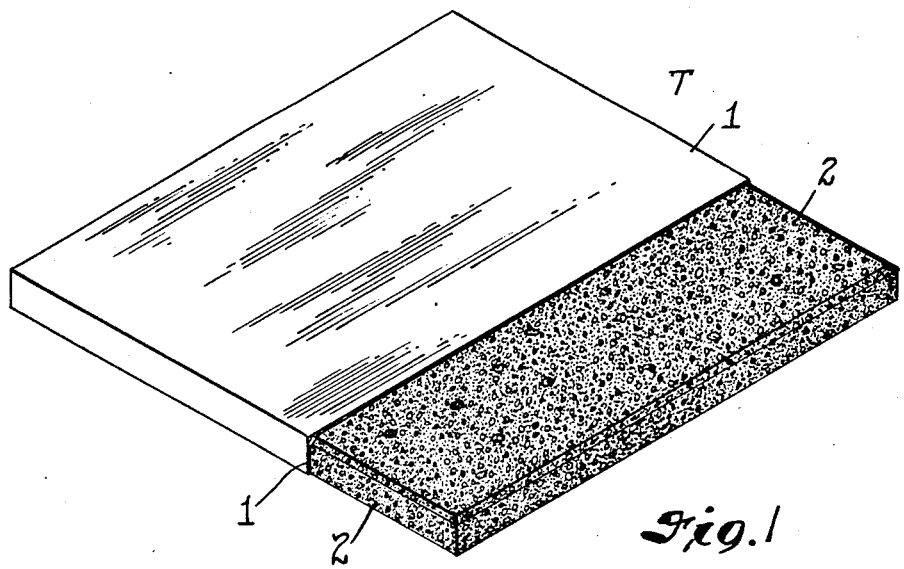

Feb. 22, 1955  R. L. DICKEY  2,702,753
FOAMED MAGNESIA TILE AND ITS METHOD OF PRODUCTION
Filed Jan. 23, 1951

INVENTOR.
RALPH L. DICKEY
BY
Oberlin & Limbach
ATTORNEYS.

United States Patent Office 2,702,753
Patented Feb. 22, 1955

2,702,753
FOAMED MAGNESIA TILE AND ITS METHOD OF PRODUCTION

Ralph L. Dickey, Shaker Heights, Ohio, assignor to Kelley Island Company, a corporation of Ohio Application January 23, 1951, Serial No. 207,305

2 Claims. (Cl. 106—88)

The present improvements, while relating generally to so-called acoustic tile, have regard to the provision of such a product which will possess other desirable characteristics in the way of light weight and fireproofing, in addition to its sound-deadening characteristics.

One principal object of this invention is to produce an acoustic tile which can be painted repeatedly without significant loss in its acoustical properties. Prior art methods of achieving this desired result such as mechanical perforation of the surface or production of surfaces with unsightly fissures or open patches are obviated by this invention. Another object of decided practical importance is the production of an acoustic tile composed almost entirely of inorganic non-combustible materials with its resultant fireproofing properties. Another object of this invention is a material which is dimensionally stable when exposed to water or saturated water vapor conditions.

Another object of the invention is to utilize in the making of tile having the foregoing characteristics so-called "Sorel" or magnesium oxychloride cement. A further object is to provide a body of set cementitious material, specifically one composed of such magnesium oxychloride cement, which will be characterized by having a definite cellular structure wherein the walls of a substantial number of the cells intersect so as to provide communicating openings for the passage of a fluid, either air or liquid, from cell to cell through said body. When used for acoustical purposes, such body, e. g. tile, will have such intercommunicating cellular structure exposed at least on one face of the tile, thus providing for high sound reduction, while at the same time the further advantage is achieved that paint and like coatings when applied will not fill or clog the surface openings.

A number of attempts have been made to produce a body of set cementitious material, either in the form of a tile or as an applied layer of plaster, which will be more or less porous. One such method has been to incorporate in the cementitious material proper a filler or aggregate which is either of lighter specific gravity or in effect rendered so by being of porous character. This method of course does not produce a cellular body in the strict sense at all.

Another method has been to include in the cementitious mixture, chemical ingredients which will react to generate a gas. It is however difficult not only to secure uniform distribution of the gas generating substances, but the size of the bubbles and thus of the resulting cells is difficult to control, at least so as to secure uniformity in such matter of size and to insure the desired intersection of the cells in the set product.

It has also been proposed to form a cellular cementitious body, specifically of concrete, by making a slurry which includes a frothing agent or foam in addition to the cement that forms the body proper. Upon agitation of the mixture, bubbles are formed which produce a cellular structure, but in order to preserve and control the latter it has been found necessary to place the article in a sealed chamber under a pressure substantially higher than atmospheric, e. g. as much as two atmospheres. Alternatively, where it was desired to rupture the cell walls so as to produce a freely porous structure, a vacuum has required to be applied to the body of cementitious material. In either case, i. e. where pressure or vacuum is used, the required setting time has been as much as twelve hours, and even then the pressure has had to be slowly restored to normal.

It has now been discovered that a set, cementitious tile, or equivalent body having a cellular structure of the character described may be readily and uniformly obtained, without the use of any such expedient as change of pressure, or long setting time being employed. In brief, it is found that by making the tile or body of set magnesium oxychloride cement having a special composition, specifically one comprising partially calcined dolomite, a reagent consisting either of magnesium chloride or magnesium sulphate, and a relatively small percentage by weight based on said dolomite of a water-soluble inorganic phosphate, it is sufficient merely to agitate a slurry of this composition with a selected wetting or foaming agent, in order to obtain a quickly setting body having a definite cellular structure with the walls of a substantial number of the cells intersecting.

To the accomplishment of the foregoing and related ends, said invention, then, consists of the means and elements hereinafter fully described and particularly pointed out in the claims.

The annexed drawing and the following description set forth in detail certain structure embodying the invention, such disclosed elements constituting, however, but one of various structural forms in which the principle of the invention may be used.

Figure 2:
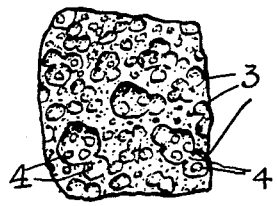

In said annexed drawing:
Fig. 1 is a perspective view of a partially finished tile for acoustical use made in accordance with the present improved method; and
Fig. 2 is a view on a magnified scale of a portion of the finished surface of such tile, such view being equally representative of a cross-section taken at any plane through the body of the tile.

As indicated above, the preferred cementitious composition which will be employed in the fabrication of the present improved tile or like product will be magnesium oxychloride cement. As is well known, the latter is ordinarily made by adding a strong solution of magnesium chloride to magnesium oxide, a suitable inert filler being admixed if desired. Preferably there is employed for the present purpose an improved form of such cement, in which, in place of a major portion of magnesium oxide, partially calcined dolomite is used, i. e. dolomite that has been heated to a temperature of about 1400° F., so that except for a small amount of impurities it is essentially magnesium oxide and calcium carbonate. However, magnesium oxide or magnesia (MgO) can be substituted for such partially calcined dolomite. The magnesium chloride solution employed in preparing this cement will preferably have a concentration of from about 22° Baumé up to a completely saturated solution. In addition, such cement will desirably include a relatively small amount, e. g. a fraction of 1%, of a water-soluble phosphate compound, which it has been found is effective to delay the normal short setting time of magnesium oxychloride cements and at the same time serves to stabilize the set product made therefrom. The foregoing ingredients in finely ground condition upon being intermixed will be cast in forms or molds which will ordinarily be square or rectangular in shape (cf. Fig. 1). In thus intermixing the ingredients sufficient water will of course be included, e. g. with the magnesium chloride solution, to form a slurry or workable plastic mass.

The preferred water-soluble phosphate compound employed in making the cementitious mixture is sodium hexametaphosphate, for which may be substituted as an equivalent either sodium polyphosphate, sodium tripolyphosphate, monobasic sodium phosphate or dibasic sodium phosphate. The phosphate compound should be finely ground or powdered so that it will be readily dissolved in the wet mix or in the magnesium chloride solution when making up the cementitious composition. Excellent products have been obtained using concentrations of from 0.5% to about 1.5% by weight of such soluble phosphate, and this represents the preferred range.

In order, then, to produce in such set product a cellular structure of the character hereinbefore described, the following additional steps which form part of the present invention are required. There is added to a suitable slurry made up of water and the foregoing cementitious mixture, consisting of magnesium oxide partially burned dolomite, magnesium chloride and stabilizing ingredient, an additional ingredient consisting of a wetting or foaming agent. Various such wetting agents, known and available for other purposes, may be used for the present purpose, but preferably one of the sulphonated and alkylated aromatic derivatives, which reduce surface tension when added to water or watery mixtures, is used. Well-known commercially available foaming agents of the liquid fatty amide type have also been found satisfactory, while best results in working with the specific cementitious compositions hereinafter described have been obtained with a monovalent tertiary amine base type of foaming agent.

Only a small amount of such wetting agent is required, viz. from 0.1% to 1.5% by weight of the total dry components of the cementitious composition. Such wetting agent will preferably be admixed with the slurry composed of the previously named ingredients and the mixture is then agitated for some minutes, e. g. 15 minutes at 35 R. P. M., where a rotary type stirrer is used.

The following tables give examples of cementitious composition ingredients and foaming agent that may be used in carrying out the invention, viz.:

*Table 1*

| Ingredient: | Parts by weight |
|---|---|
| Partially calcined dolomite | 80 |
| Magnesium oxide | 20 |
| Stabilizer | 0.3 |
| Foaming agent | 0.5 |
| Magnesium chloride (22° Bé.) | 100 |

*Table 2*

| | |
|---|---|
| Partially calcined dolomite | 100 |
| Stabilizer | 0.3 |
| Foaming agent | 0.5 |
| Magnesium chloride (22° Bé.) | 70 |

The following table indicates the range of ingredients which may be employed in making the foregoing, viz.:

*Table 3*

| Ingredient: | Parts by weight |
|---|---|
| Partially calcined dolomite | 0–100 |
| Magnesium oxide | 100–0 |
| Stabilizer | 0.05–1.5 |
| Foaming agent | 0.1–1.5 |
| Inert filler | 50–0 |
| Magnesium chloride (22° Bé.) | 50–120 |

A further feature of the invention, is that a minor amount of a fiber, such as glass yarn, appreciably increases the mechanical strength of the product. Glass textile yarn in lengths of about ¼ to 1 inch are most desirable. Examples are as follows:

*Table 4*

| Ingredient | Parts by Weight | |
|---|---|---|
| Partially calcined dolomite | 80 | 80 |
| Magnesium oxide | 20 | 20 |
| Stabilizer | 0.3 | 0.3 |
| Foaming agent | 0.5 | 0.5 |
| Magnesium chloride (22° Bé.) | 100 | 100 |
| ½ inch length glass yarn | | *1 |
| Transverse strength 1 lb. 1 Sq. In | 27 | 65 |

*The amount of glass yarn may vary from ½ to 2 parts.

Immediately following the previously described stirring step, the mixture is then cast in a mold or otherwise formed into a slab or tile of desired dimensions.

The term "tile" as employed herein will be understood to connote any set body thus formed from a cementitious mixture in the manner described, whether in the form of a tile, slab or other shape. Where intended to be used for acoustical, i. e. sound deadening, purposes, the material will preferably take the form of a tile T, as illustrated in Fig. 1, approximately a foot square and approximately one inch thick, but there is no limitation in the matter of such dimensions on the size or shape of the tile. Furthermore, where intended for such use the exterior layer 1 will be removed from one of the flat surfaces as well as from the lateral edges of the tile. This operation may be accomplished by suitable grinding means such as an abrasive wheel or by a plane. The result will be to leave a surface 2 in which is exposed the interior cellular structure of the tile which is produced by the action of the aforesaid wetting agent when added to the cementitious mixture proper, and the latter is thereupon agitated as described. This cellular structure, as best illustrated in Fig. 2, is characterized not only by the large number of cells 3 which are formed by the temporary occlusion of gas, i. e. air, bubbles in the cementitious mixture prior to setting, but by the fact that substantially all of such cells intersect so as to provide communicating openings 4 for the passage of a fluid from cell to cell through the body of set material.

In any tile perforated by mechanical means, such as heretofore used for sound deadening purposes, the number of openings is necessarily limited. In counterdistinction to this the present improved tile presents an infinite number of pores through which sound may penetrate until thoroughly absorbed. The degree of such absorption by approved test of tile made as described and having a thickness of 13/16 inch, is shown by the following table:

*Table 5*

| Frequency (cycles/sec.) | 128 | 256 | 512 | 1,024 | 2,048 | 4,096 | N. R. |
|---|---|---|---|---|---|---|---|
| S. A. coefficient | .11 | .32 | .70 | .87 | .79 | .78 | .65 |

It is assumed that the cellular form of the pores, coupled with their interconnection, as described and shown in Fig. 2, is largely responsible for the foregoing results. Furthermore, it has been found that the surface of tile having this unique cellular structure may be painted repeatedly without loss of sound-absorption, i. e. without the surface openings becoming filled or clogged. In other words, the communicating openings between the exposed cells and those within the body of the tile, by capillary action or otherwise, serve to conduct a paint or like coating applied to the surface into the interior of the tile so that it does not collect in the exposed cells.

The following table gives the results of tests as to the paint absorbing capacity of tile prepared by this invention; the tile tested being substantially the same as that covered in the preceding table and about .2 pound of paint solids being applied to the tile surface in these tests.

*Table 6*

| Sound coefficient at 512 cycles/sec. | Brush number of applications of oil paint |
|---|---|
| .68 | none |
| .70 | 3 |
| .66 | 8 |
| .68 | 12 |

In order to express as a quantitative number the paintability of the tile, a simple method will be to count the number of cells or pores larger than a given size along a line on the surface of the tile. Actually in order to obtain a paintability index a transparent ruler marked in centimeters and subdivided into millimeters was placed on the surface of the tile. It was then determined by use of a suitable microscope whether the point of intersection of the one-millimeter line with the ruler edge was over a pore larger than one millimeter in diameter at the surface, one millimeter being selected as the dividing size of pore closed during painting. Then the intersection of the two-millimeter line with the ruler edge was observed to determine whether it fell over a pore larger than one millimeter in diameter, and so on up to the 100-mm. line. The total number of the points which fell over pores larger than one millimeter in diameter was recorded. This procedure was carried out eight times for each specimen, placing the ruler in a different position each time. The arithmetical average of the eight recorded numbers was then considered the "paintability index" for the sample. The following tabulation shows the index obtained in this way for the various samples, and also the highest and lower number recorded for each.

Table 7

| Sample Designation | Paintability Index | Highest Number | Lowest Number |
|---|---|---|---|
| Nonpaintable | 5 | 10 | 1 |
| Poor paintability | 14 | 20 | 6 |
| Good paintability | 24 | 39 | 11 |
| Very good paintability | 58 | 70 | 52 |

The preceding tabulation indicates that the paintability index should be greater than 14 and preferably in excess of 24, for good paintability. However, if the paintability index is too high, the tile has poor light reflectivity. For these reasons, a paintability index as high as 58 is not desirable.

Where the tile is made from magnesium oxychloride cement, as in the preferred form described, the natural white color, coupled with the pleasing texture of the exposed cellular structure, permits it to blend perfectly with any architecture, in any type of building construction. In its natural white color the tile has been found to reflect as much as 80% of the light that strikes it, by actual test with a Taylor Sphere Reflectometer; yet despite the high percentage of light reflected, such light is completely free of glare.

Because of the incombustible nature of the material thus employed in making the present improved tile, it acts as a positive fire-retardant, and this desirable characteristic is measurably accentuated by the unique cellular structure of the tile.

Results comparable with those obtained with the above-described magnesium oxychloride cementitious material are also obtainable with corresponding magnesium oxysulphate cements to which indicated small amounts of a water-soluble inorganic phosphate have been added. A specific example of such a cement will be composed of approximately 3 parts partially calcined dolomite to 1 part of magnesium sulphate ($MgSO_4 \cdot 7H_2O$) with the addition of 0.2% by weight, based on said dolomite, of sodium hexametaphosphate. To a slurry of the foregoing ingredients, approximately the same amount of wetting agent, as before, is added, the mixture agitated and then cast in the manner previously described.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:

1. An acoustical tile composed of a foamed magnesia cement selected from the group consisting of magnesium oxychloride and magnesium oxysulphate cements having a multitude of small cellular interconnecting voids therethrough affording a homogeneous labyrinthine structure exposed at at least one surface of said tile, such exposed interconnecting cellular voids providing closely spaced irregular sound absorbing passages opening to such surface.

2. The method of making an acoustical tile which comprises the steps of preparing a water slurry of magnesia cement, selected from the group consisting of magnesium oxychloride and magnesium oxysulphate cements, by mixing together magnesium oxide and a magnesium salt solution selected from the group consisting of magnesium chloride and magnesium sulphate, adding to such slurry from about .05 per cent to about 1.5 percent by weight of a water-soluble alkali metal phosphate, further adding to the slurry a foam forming agent in an amount of about 0.1 percent to about 1.5 percent by weight based on the weight of the dry ingredients, agitating the resultant mixture uniformly and thoroughly to foam the same and thus produce a multitude of air bubbles in the slurry a large proportion of which contact contiguous bubbles, casting the foamed mixture in tile form, drying the material by elimination of moisture with a resultant breakdown of contiguous bubble walls to form a labyrinthine structure, and removing the relatively continuous exterior layer of the set tile which results from contact with the casting mold from at least one face of the tile, thereby to expose the cellular structure of the tile at such face.

References Cited in the file of this patent
UNITED STATES PATENTS

| | | |
|---|---|---|
| 1,458,631 | Sabine | June 12, 1923 |
| 1,634,505 | McCaughey | July 5, 1927 |
| 1,782,383 | Greider | Nov. 18, 1930 |
| 1,906,123 | Eaton | Apr. 25, 1933 |
| 2,017,022 | Roos | Oct. 8, 1935 |
| 2,037,995 | New | Apr. 21, 1936 |
| 2,058,985 | Hubbell | Oct. 27, 1936 |
| 2,233,973 | Dunn | Mar. 4, 1941 |
| 2,351,641 | Sohl et al. | June 20, 1944 |
| 2,382,561 | Gregory | Aug. 14, 1945 |
| 2,451,446 | Parsons | Oct. 12, 1948 |
| 2,543,959 | Eastin | Mar. 6, 1951 |
| 2,556,031 | Dickey | June 5, 1951 |
| 2,598,980 | Denning | June 3, 1952 |

FOREIGN PATENTS

| | | |
|---|---|---|
| 546,335 | Great Britain | July 8, 1942 |